(12) United States Patent
Fayssal

(10) Patent No.: US 9,215,152 B2
(45) Date of Patent: Dec. 15, 2015

(54) HIGH EFFICIENCY NETWORK MONITORING SYSTEM AND METHODS

(71) Applicant: GFI Software IP S.à.r.l., Luxembourg (LU)

(72) Inventor: Samer Nabih Fayssal, Dunedin, FL (US)

(73) Assignee: LOGICNOW LIMITED, Dundee (GB)

( * ) Notice: Subject to any disclaimer, the term of this patent is extended or adjusted under 35 U.S.C. 154(b) by 346 days.

(21) Appl. No.: 13/955,484

(22) Filed: Jul. 31, 2013

(65) Prior Publication Data

US 2015/0036515 A1 Feb. 5, 2015

(51) Int. Cl.
*H04L 12/26* (2006.01)
*H04W 24/08* (2009.01)
*H04W 24/10* (2009.01)

(52) U.S. Cl.
CPC .............. *H04L 43/028* (2013.01); *H04L 43/02* (2013.01); *H04W 24/08* (2013.01); *H04W 24/10* (2013.01)

(58) Field of Classification Search
None
See application file for complete search history.

(56) References Cited

U.S. PATENT DOCUMENTS

| 8,196,199 | B2 | 6/2012 | Hrastar |
| 8,213,302 | B2 | 7/2012 | Wang |
| 2008/0285483 | A1 | 11/2008 | Gil |
| 2011/0249572 | A1* | 10/2011 | Singhal ................ H04L 41/069 370/252 |
| 2013/0016628 | A1 | 1/2013 | Bertani |
| 2013/0117842 | A1* | 5/2013 | Kakadia ................ H04W 24/00 726/22 |
| 2014/0280892 | A1* | 9/2014 | Reynolds .............. H04L 43/028 709/224 |
| 2014/0304393 | A1* | 10/2014 | Annamalaisami ...... H04L 43/04 709/224 |

OTHER PUBLICATIONS

Fayssal, unpublished U.S. Appl. No. 13/890,1380 "Multi-Mode Wireless Networking System and Method," filed May 9, 2013.

* cited by examiner

*Primary Examiner* — Michael Thier
*Assistant Examiner* — Eric Myers
(74) *Attorney, Agent, or Firm* — Johnson & Martin, P.A.; James David Johnson

(57) ABSTRACT

A system and methods for monitoring wireless local area networks (WLAN) and reporting essential data is disclosed. The system optimizes and decides fundamentals before monitoring to enhance network monitoring efficiency. The system improves over prior problematic solutions that inefficiently monitor all data communicated over a network before filtering. The system may include instructions storable in memory to be executed by a processor. The system may include analytical engines, such as a resource analysis engine, fundamentals analysis engine, traffic analysis engine, optimization engine, and monitoring engine. The invention monitors subsets of the network traffic fundamentals that can be at least partially identified via metadata. The system may include exploring networks, identifying fundamentals of network traffic, assessing and evaluating the chosen fundamentals, optimizing fundamentals, and using a list of optimized fundamentals for network traffic monitoring.

20 Claims, 5 Drawing Sheets

HIGH EFFICIENCY NETWORK MONITORING SYSTEM AND METHODS

FIELD OF THE INVENTION

The invention relates to networks. More particularly, the invention relates to efficient monitoring of managed wireless networks.

BACKGROUND

A wireless local area network (WLAN) is established using a wireless router switch, which mostly provides local area network access to wirelessly connected client devices. Client devices may be client stations, such as notebook/laptop computers, smart phones, tablets, and other portable computer network devices. Wireless devices can include either wireless routers or client devices. Wireless network traffic includes a set of communication messages, known as frames, between any two devices.

Network monitoring is the process of collecting all frames that are flowing on wireless network channels. A channel is a range of radio frequency on which data can be communicated. A wireless network functions within a pre-assigned range of frequencies. Each wireless networking frame is defined within a standard, such as IEEE 802.11. Wireless networking is typically transmitted using a radio that includes a hardware transceiver to send and receive signals on one channel at a time. Received signals are interpreted as bits. A frame is a group of logically organized bits.

If a bit is lost in the communication channels, it may corrupt construction of a frame. Larger distances between a transmitter and receiver generally cause more signals to fade, get lost, or require being replicated. For this reason, a monitor can function within an acceptable geographic range from wireless networking transmitters due to having the transmission power of all wireless networking devices permitted within a small signal range. In addition to frame collection, wireless networks can be monitored by examining the activity of a networking device internally.

The routers log network traffic, utilizing its hardware for connectivity. However, this type of monitoring is limited to traffic through each examined device and not a general external monitoring. Another type of monitoring is network mapping. With network mapping, networks can be traced using simplistic path-tracing tools. Each of the above monitoring techniques brings different set of network information.

Network analysis is the process of examining the monitored data to find common patterns to identify network behavior. Due to the large amount of monitored network information, it is hard to focus on details. For this reason, network data and/or data values typically must be mined or summarized without losing data details.

What is needed is a system and method to monitor and analyze network traffic communicated over one or more networks with high efficiency. What is needed is a system and method to monitor and analyze network traffic within the analytic capacity of the system. What is needed is a system and method to efficiently monitor network traffic by substantially ignoring irrelevant and redundant data transmissions. What is needed is a system and method to at least partially determine the relevance of network traffic by analyzing metadata.

SUMMARY

The present invention provides a system and method to monitor and analyze network traffic communicated over one or more networks with high efficiency. Additionally, the present invention provides a system and method to monitor and analyze network traffic within the analytic capacity of the system. The present invention also provides a system and method to efficiently monitor network traffic by substantially ignoring irrelevant and redundant data transmissions. Furthermore, the present invention provides a system and method to at least partially determine the relevance of network traffic by analyzing metadata.

The present invention provides a system and methods for monitoring wireless local area (WLAN) network and reporting essential data. The system and methods of the present invention advantageously monitor a network with high efficiency by intelligently using the resources available by the system. The system may include instructions storable in memory to be executed by a processor. The system may include analytical engines, such as a resource analysis engine, fundamentals analysis engine, traffic analysis engine, optimization engine, and monitoring engine. The invention monitors subsets of the network traffic fundamentals that can be at least partially identified via metadata. The system may include exploring networks, identifying fundamentals of network traffic, assessing and evaluating the chosen fundamentals, optimizing fundamentals, and using a list of optimized fundamentals for network traffic monitoring Accordingly, an embodiment of the present invention features a method aspect for monitoring networks using a system including a processor and memory. The method may include mapping resources of the system to determine an analytic capacity. The method may also include analyzing fundamentals respective to the analytic capacity to determine a subset of data to be analyzed, wherein the fundamentals are at least partially identifiable by analyzing metadata of network traffic. The method may include analyzing the metadata for the fundamentals in the subset to determine a wireless connection to be monitored, further including scanning the networks in user mode to determine routers on each channel, placing the routers detected in a router list, scanning the networks in monitor mode to determine users connected to the networks, placing the users detected in a user list, and analyzing the router list and the user list to determine the network traffic for monitoring to be placed in a traffic list. The method may include optimizing the subset for analysis efficiency, further including analyzing the fundamentals in the traffic list, removing the fundamentals that communicate the network traffic that is redundant from the traffic list, ranking the fundamentals remaining in the traffic list according to analytical priority, and designating the resources of the system to each of the fundamentals to be analyzed. Additionally, the method may include monitoring the network traffic relating to the fundamentals to be analyzed prior to expiration of a grand reset period and resetting after the grand reset period has expired.

In another aspect of the method, mapping the resources may include scanning the system to determine a processing capacity of the processor and a memory capacity of the memory, scanning a network adapter of the system to determine a network capacity including connection speed and a level of network consumption, comparing the processing capacity, the memory capacity, and the network capacity to determine a consumption threshold; and determining the analytic capacity to not exceed the consumption threshold of a given period of analysis.

In another aspect of the method, mapping the resources may include, before comparing capacities, scanning utilization of peripheral networks to determine a universal bandwidth capacity. Additionally, operation of comparing capacities may include comparing the universal bandwidth capacity with the processing capacity, the memory capacity, and the network capacity to determine the consumption threshold.

In another aspect of the method, scanning in monitor mode may include waking devices connected via the networks that are in sleep mode.

In another aspect of the method, wherein determining a wireless connection to be monitored further includes removing the routers not of interest from the router list, removing the users not of interest from the user list, and placing the network traffic not being monitored in a collecting list accessible for supplemental analysis when demanded and where the resources permit.

In another aspect of the method, determining the wireless connection to be monitored may further include analyzing ad-hoc network traffic and mesh network traffic operating at least partially within range of the networks to be monitored.

In another aspect of the method, analyzing the metadata may include extracting the metadata from a local monitor and sending at least part of the metadata to a remote server for additional analysis.

In another aspect of the method, the grand reset period may be independently definable for each of the networks.

According to an embodiment of the present invention, a method aspect for monitoring networks using a system including a processor and memory is provided. The method aspect may include analyzing fundamentals respective to an analytic capacity of the system to determine a subset of data to be analyzed, wherein the fundamentals are at least partially identifiable by analyzing metadata of network traffic. The method aspect may also include analyzing the metadata for the fundamentals in the subset to determine a wireless connection to be monitored. Additionally, the method aspect may include optimizing the subset for analysis efficiency. Optimizing may additionally involve including the fundamentals to be analyzed in a traffic list, analyzing the fundamentals in the traffic list, removing the fundamentals that communicate the network traffic that is redundant from the traffic list, ranking the fundamentals remaining in the traffic list according to analytical priority, and designating resources of the system to each of the fundamentals to be analyzed. The method aspect may include monitoring the network traffic relating to the fundamentals to be analyzed prior to expiration of a grand reset period and resetting after the grand reset period has expired. For the method aspect, the grand reset period may be independently definable for each of the networks. The metadata may be extractable using a local monitor and at least part of the metadata may be transmittable to a remote server for additional analysis. Ad-hoc network traffic and mesh network traffic operating at least partially within range of the networks to be monitored is detectable via the metadata and subject to analysis.

In another aspect of the method, resources of the system may be mapped to determine the analytic capacity.

In another aspect of the method, mapping the resources may include scanning the system to determine a processing capacity of the processor and a memory capacity of the memory, scanning one or more network adapters that are installed to the system to determine a network capacity including connection speed and a level of network consumption, comparing the processing capacity, the memory capacity, and the network capacity to determine a consumption threshold, and determining the analytic capacity to not exceed the consumption threshold for a given period of analysis.

In another aspect of the method, mapping the resources additionally includes before comparing capacities, scanning utilization of peripheral networks to determine a universal bandwidth capacity. Additionally, comparing capacities further includes comparing the universal bandwidth capacity with the processing capacity, the memory capacity, and the network capacity to determine the consumption threshold.

In another aspect of the method, determining the wireless connection to be monitored may include scanning the networks in user mode to determine routers on each channel, placing the routers detected in a router list, scanning the networks in monitor mode to determine users connected to the networks, placing the users detected in a user list, and analyzing the router list and the user list to determine the network traffic for monitoring to be placed in a traffic list.

In another aspect of the method, determining the wireless connection to be monitored may include scanning in monitor mode, further including waking devices connected via the networks that are in sleep mode.

In another aspect of the method, determining the wireless connection to be monitored may additionally include removing the routers not of interest from the router list, removing the users not of interest from the user list, and placing the network traffic not being monitored in a collecting list accessible for supplemental analysis when demanded and where the resources permit.

According to an embodiment of the present invention, a system is provided for monitoring networks. The system may include memory to hold executable instructions and a processor for executing the instructions stored in the memory. The system may also include a resource analysis engine to map resources of the system to determine an analytic capacity. Additionally, the system may include a fundamentals analysis engine to analyze fundamentals respective to the analytic capacity and determine a subset of data to be monitored. The fundamentals are at least partially identifiable by analyzing metadata of network traffic.

The system may additionally include a traffic analysis engine for analyzing the metadata for the fundamentals in the subset to determine a wireless connection to be monitored. The traffic analysis engine may perform steps for scanning the networks in user mode to determine routers on each channel, placing the routers detected in a router list, removing the routers not of interest from the router list, scanning the networks in monitor mode to determine users connected to the networks, placing the users detected in a user list, removing the users not of interest from the user list, analyzing the router list and the user list to determine the network traffic for monitoring to be placed in a traffic list, and placing the network traffic not being monitored in a collecting list accessible for supplemental analysis when demanded and where the resources permit.

The system may also include an optimization engine for optimizing the subset for analysis efficiency. The optimization engine may perform steps including analyzing the fundamentals in the traffic list, removing the fundamentals that communicate the network traffic that is redundant from the traffic list, ranking the fundamentals remaining in the traffic list according to analytical priority, and designating the resources of the system to each of the fundamentals to be analyzed. Additionally, the system may include a monitoring engine to monitor the network traffic relating to the fundamentals to be analyzed prior to expiration of a grand reset period. Monitoring of the network traffic may be reset after the grand reset period has expired. The grand reset period may be independently definable for each of the networks. Scanning in monitor mode may further include waking devices connected via the networks that are in sleep mode.

In another aspect, the resource analysis engine may further perform steps that include scanning the system to determine a processing capacity of the processor and a memory capacity of the memory, scanning one or more network adapters of the system to determine a network capacity including connection speed and a level of network consumption, comparing the processing capacity, the memory capacity, and the network capacity to determine the a consumption threshold, and determining the analytic capacity to not exceed the consumption threshold for a given period of analysis.

In another aspect, the resource analysis engine may scan utilization of peripheral networks to determine a universal bandwidth capacity. The resource analysis engine may compare the universal bandwidth capacity with the processing capacity, the memory capacity, and the network capacity to determine the consumption threshold.

In another aspect, ad-hoc network traffic and mesh network traffic operating at least partially within range of the system's network cards is optionally monitored by the traffic analysis engine.

In another aspect, analyzing the metadata may include extracting the metadata from a local monitor and sending at least part of the metadata to a remote server for additional analysis.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
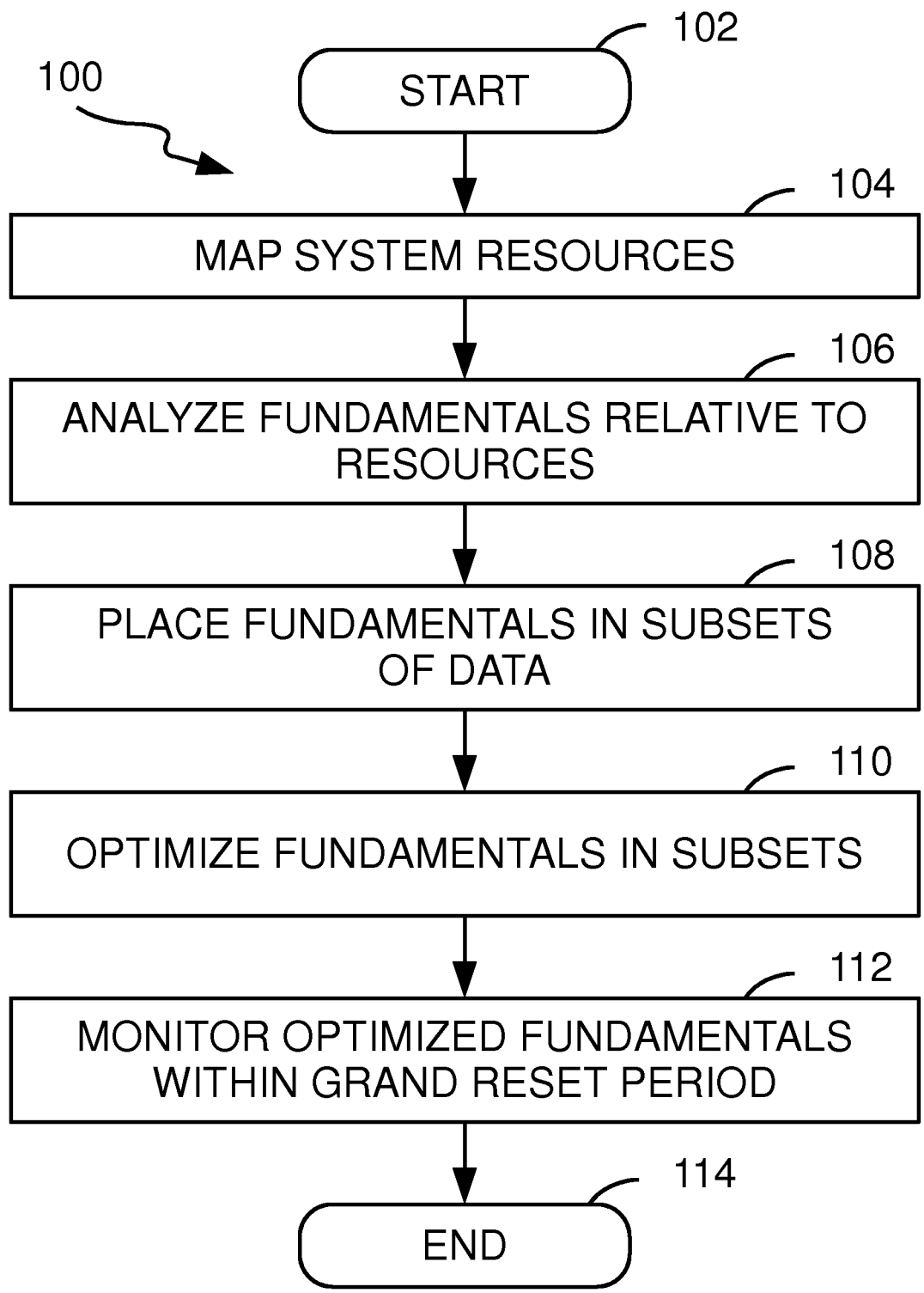
FIG. 1 is a flowchart that illustrates monitoring networks, according to an embodiment of the present invention.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, a high efficiency network monitoring system and methods will be discussed. Those of skill in the art will appreciate alternative labeling of the high efficiency network monitoring system and methods as a networking system, network monitoring system, analysis and monitoring system, wireless communication monitoring method, system for management of wireless networks, system, method, the invention, or other similar names. Skilled readers should not view the inclusion of any alternative labels as limiting in any way.

The invention provides a system for efficiently monitoring a network. The system may be operated on one or more wireless networking devices to enhance the efficiency of monitoring networks. The system may be operated on a localized system and/or one or more wireless networking device to increase performance of monitoring network traffic communicated over one or more networks. Used throughout this disclosure, data communication is defined to include transmission and reception of data, without limitation. A wireless networking device is discussed throughout this disclosure in the context of a client device or wireless router, but may also include any device capable of communicating over a wireless network. Additional wireless networking devices may include additional client devices, such as desktop computers, notebook/laptop computers, printers, smartphones, network attached storage (NAS) devices, tablets, music players, televisions, audiovisual equipment, other electronic devices, and other devices that would be apparent to a person of skill in the art. Skilled artisans will appreciate that wireless networking devices may include at least one wireless network interface controller.

The high efficiency network monitoring system of the present invention may include a system of computerized components capable of executing programmatic instructions stored in memory. The system may include one or more programmatic engines that, when executed, perform an analytical function for the system. Skilled artisans will appreciate that the engines described throughout this disclosure may work independently or collectively. Skilled artisans should also appreciate that one engine may or may not be included by another engine, partially or in its entirety, without limitation. Programmatic engines will be discussed in greater detail below.

The system may monitor network traffic, or data transmitted over one or more networks. The network traffic may be communicated between devices using network interface controllers. Skilled artisans will appreciate that the term wireless network interface controller, wireless networking interface controller, wireless networking card, network adapter, LAN adapter, and other similar terms may be used interchangeably, without limitation. A network interface controller is a computer hardware component that allows communication of a computerized device over a network. The network interface controller may receive data from various components of a computerized device, which it may then relay over a network. Similarly, the network interface controller may receive data from a network connection, which it may then relay to various components of the computerized device. A network interface controller may operate over a physically connected local area network (LAN) or wirelessly over a wireless local area network (WLAN).

A wireless network interface controller operates similarly to that of a traditional network interface controller, with the additional capability to communicate data wirelessly. Generally, a wireless network interface controller will include one or more radio transceivers, which may broadcast and receive radio signals over the air. A wireless network interface controller may communicate data with other devices using one or more data transmission protocols, for example, but not limited to, IEEE 802.11 Wi-Fi, token ring networks, Bluetooth, or other network protocols that would be apparent to a person of skill in the art. In the interest of clarity, the present invention will be discussed in the context of the IEEE 802.11 protocols without limitation.

As will be apparent to those of skill in the art, IEEE 802.11 defines various frequency ranges at which data may be transmitted, which are segmented into channels. Various devices may communicate different packets of data using a single channel. Additionally, some channels defined by the IEEE 802.11 specification overlap with other channels. As more data communications are broadcast over the same frequency ranges, congestion may occur and degrade communication rates and connectivity.

Throughout this disclosure, communication of data is discussed as occurring over a wireless network. A wireless network is any type of connection between two or more electronic devices to communicate data or information without being physically attached by wires or cables. For example, a wireless network may be a wireless local area network (WLAN). A WLAN is typically a wireless network established to provide communication between two or more wireless devices within a moderately short distance from a managing device, such as a wireless router. As discussed above, a WLAN may be compliant with a standard such as IEEE 802.11, communicate using a proprietary standard, and/or use another protocol that would be apparent to a skilled artisan. The WLAN may communicate with one or more wired device through the use of a wireless bridge, as may be provided by a wireless router. For example, a wireless device may wirelessly communicate with the wireless router, which may then relay the communication to a wired electronic device via a cable, such as an Ethernet cable.

To communicate data between a transmitting wireless device and a receiving wireless device, the communication must generally be made over the same channel. A wireless network interface controller may receive virtually every bit communicated over a given channel, assuming the transmitting device is within range of the receiving device, including data intended for different wireless devices.

A wireless network interface controller may operate in a variety of modes to communicate data, analyze network conditions, receive network traffic data, or otherwise gather data relating to one or more network. A wireless network interface controller may operate in a monitor mode or a managed mode. In monitor mode, the wireless network interface controller may receive data relating to one or more condition of a network environment, even if the data is intended for different wireless devices. In managed mode, the wireless network interface controller may control the communication of data with one or more other wireless device. Also, in managed mode, the wireless network interface controller may perform user mode scanning, which may gather general information about network conditions. The wireless network interface controller may include a mode control switch to change operation of the wireless network interface controller between monitor mode and managed mode.

Operation of the wireless network interface controller in monitor mode will now be discussed in more detail. As discussed above, monitor mode may be used to detect and analyze one or more condition of a network environment. Typically, operating a wireless network interface controller in monitor mode prohibits the wireless network interface controller from communicating data with other wireless devices. Thus, operating a wireless network interface controller in monitor mode generally causes a user to experience disconnection from a wireless network and interruption to data transmission. Since some network applications require constant data connections, or real-time communication characteristics, such disconnections and interruptions are undesirable.

Operation of the wireless network interface controller in managed mode will now be discussed in more detail. As discussed above, managed mode may be used to communicate data over a wireless network with one or more other wireless devices. Typically, operating a wireless network interface controller in managed mode prohibits the wireless network interface controller from detecting detailed conditions of a network, such as network traffic for other users or wireless devices. However, while operating in managed mode, a wireless network interface controller may detect some general network information through user mode scanning.

User mode scanning allows a network to be scanned and monitored without requiring the wireless network interface controller to change from the managed mode to the monitor mode. User mode scanning may collect general network information, but does not recognize user or detailed wireless network traffic information. User mode scanning may advantageously be operated while the wireless network interface controller is in managed mode, thus not causing an interruption to data communication. Thus, if a particular data communication task requires a high data communication threshold of performance, scanning a network via user mode scanning typically will not affect compliance with the data communication threshold.

To monitor communication of network traffic through one or more networks, a system may be operated on a computerized device. An illustrative computerized device will now be discussed in greater detail, without limitation. The computerized device may include a processor, memory, network controller, and optionally an input/output (I/O) controller Skilled artisans will appreciate additional embodiments of a computerized device that may omit one or more of the aforementioned components or include additional components without limitation. The processor may receive and analyze data. The memory may store data, which may be used by the processor to perform the analysis. The memory may also receive data indicative of results from the analysis of data by the processor.

The memory may include volatile memory modules, such as random access memory (RAM), or non-volatile memory modules, such as flash based memory Skilled artisans will appreciate the memory to additionally include storage devices, such as, for example, mechanical hard drives, solid state drive, and removable storage devices.

The computerized device may also include a network controller, which may be a wireless network interface controller. The network controller may receive data from other components of the computerized device to be communicated with other computerized devices via a network. The communication of data may be performed wirelessly. More specifically, without limitation, the network controller may communicate and relay information from one or more components of the computerized device, or other devices and/or components connected to the computerized device, to additional connected devices. Connected devices are intended to include data servers, additional computerized device, mobile computing devices, smart phones, tablet computers, and other electronic devices that may communicate digitally with another device.

The computer may also include an I/O interface. The I/O interface may be used to transmit data between the computerized device and extended devices. Examples of extended devices may include, but should not be limited to, a display, external storage device, human interface device, printer, sound controller, or other components that would be apparent to a person of skill in the art. Additionally, one or more of the components of the computerized device may be communicatively connected to the other components via the I/O interface.

The components of the computerized device may interact with one another via a bus. Those of skill in the art will appreciate various forms of a bus that may be used to transmit data between one or more components of an electronic device, which are intended to be included within the scope of this disclosure.

The computerized device may communicate with one or more connected devices via a network. The computerized device may communicate over the network by using its network controller. More specifically, the network controller of the computerized device may communicate with the network controllers of the connected devices. The network may be, for example, the internet. As another example, the network may be a WLAN. However, skilled artisans will appreciate additional networks to be included within the scope of this disclosure, such as intranets, local area networks, wide area networks, peer-to-peer networks, and various other network formats. Additionally, the computerized device and/or connected devices may communicate over a network via a wired, wireless, or other connection, without limitation.

The wireless networking devices, including routers and client devices operated by users, may be connected to a managed network monitored and analyzed by the system. In a managed network, information and network traffic communicated by networking devices is monitored by a system to detect problems and analyze the flow of data. The managed network may monitor network conditions and identify problems with connectivity and data throughput that may arise.

Traditionally, wireless monitoring agents for managed networks collect data and send it to a local or remote storage where it can be analyzed, displayed, or used for triggering alerts. The present invention improves on the present design by offering different methods to monitor wireless local area network (WLAN). The present invention can advantageously monitor subsets of the network traffic and communication data and report metadata to be analyzed and displayed. The metadata may include information sufficient to perform useful analyses and generate useful alerts and/or actions.

Traditional monitoring systems observe all network traffic and, at a later stage, analyze the voluminous amount of gathered data. Conversely, the present invention advantageously monitors only network traffic that includes relevant data and that is not redundantly transmitted. Using the present invention, data to be analyzed can be determined prior to analysis, enhancing the efficiency of the analysis for a system with given resources. Data communications to be analyzed can be filtered from the totality of network traffic prior to analysis, reducing the computational overhead of available system resources.

The disclosed system determines data subsets prior to initiating the monitoring process. By identifying data subsets of interest prior to monitoring, the present invention may reduce traffic overhead caused from monitoring resources. The disclosed system tunes the data subsets according to current system resources, advantageously improving system performance for long term monitoring.

The system may include one or more engines to perform communication, analytic, and/or control tasks. Skilled artisans will appreciate that an engine may include a group of instructions that can be executed via hardware and/or software. Such engines may include a resource analysis engine to analyze resources of a system, a fundamentals analysis engine to analyze fundamentals, a traffic analysis engine to determine a wireless connection to be monitored, an optimization engine to determine analysis efficiency, and a monitoring engine to monitor network traffic.

The resource analysis engine will now be discussed in more detail. The resource analysis engine may map resources of the system to determine an analytic capacity. More specifically, the resource analysis engine may analyze one or more of the components of the system to determine an analytic capacity of individual components and the system as a whole. For example, the resource analysis engine may scan the system to determine a processing capacity and a memory capacity. The processing capacity may be determined by evaluating the number of processing cores available, the rate at which each processing core may operate, and a number of instructions the processing cores may execute in a given period. The memory processing capacity may be determined by evaluating the amount of memory available to the system, the throughput at which memory may be read and written from a storage medium such as a hard disk or removable disk, and rate at which instructions stored by the memory are accessible by a processing core.

The resource analysis engine may also scan a network adapter to determine a network capacity. More specifically, the resource analysis engine may determine a network capacity by evaluating a data transmission rate determinable by the hardware constraints of the network adapter and dynamic constraints and fluctuations of a connected communications network. The resource analysis engine may also determine a level of network consumption across the connected networks. The resource analysis engine may collectively analyze these properties of the network adapter and connected networks to determine the network capacity.

The resource analysis engine may also scan peripheral networks to determine a universal bandwidth capacity. The peripheral networks may include other communication networks maintained and/or operated by an entity outside of the managed network. It can be advantageous to be cognizant of the behaviors of peripheral networks, since they may interfere with and/or impact performance of the managed network.

The resource analysis engine may then compare the processing capacity, the memory capacity, the network capacity, and/or the universal bandwidth capacity to determine a consumption threshold. Skilled artisans will appreciate that in different embodiments, the resource analysis engine may compare one or more of the above referenced capacities and/or additional capacities that would be apparent after having the benefit of this disclosure to determine the consumption threshold. The resource analysis engine may then determine an analytic capacity that does not exceed the consumption threshold for a given period.

The fundamentals analysis engine will now be discussed in greater detail. The fundamentals analysis engine may analyze fundamentals respective to the analytic capacity determined by the resource analysis engine. The term "fundamentals" is borrowed from signal processing, where the signal is split into fundamental signal and harmonics. The fundamental signal is the main signal while harmonics are replicas of the same signal information. Throughout this disclosure, fundamental is used to describe main data transmitted in the network traffic, with the rest of the data being redundant.

The fundamentals analysis engine may determine the fundamentals categorize relevant and data transmitted in the network traffic that is not redundant in a subset to be monitored. The fundamentals to be included in the subset may be at least partially identifiable by analyzing metadata of the networking traffic.

In one embodiment, to process data of the network traffic into subsets, a local monitor may extract metadata from the collected data. The metadata may then be sent to one or more remote server to be further analyzed and displayed. Metadata includes essential data that could be needed by the system analyzer. The disclosed system may then assess the system resources to be prepared to be self-balanced with any network changes.

The traffic analysis engine will now be discussed in greater detail. The traffic analysis engine may analyze the metadata for the fundamentals in the subsets to determine a wireless connection to be monitored. The wireless connection may include one or more user, client device, and/or router. In an illustrative operation, the traffic analysis engine may scan the networks in user mode to determine routers in a channel, which may be placed in a router list L(wr). The traffic analysis engine may also scan the networks in monitor mode to determine users connected to the networks, which may be placed in a user list L(u). Routers and users that are not of interest may be removed from their respective lists. The router list L(wr) and user list L(u) may be analyzed together to determine network traffic for monitoring, which may be placed in a traffic list T(u,wr). Network traffic not being monitored may be placed in a collecting list C(u,wr). The system may analyze part or all of the network traffic included in the collecting list C(u,wr) if resources permit and such analysis is demanded. Optionally, the traffic analysis may also monitor network traffic being communicated on ad-hoc and/or mesh networks.

The optimization engine will now be discussed in greater detail. The optimization engine may rank the fundamentals in a subset to enhance analysis efficiency. The optimization engine may analyze the fundamentals in the list, removing the fundamentals that communicate network traffic that is redundant from the traffic list generated by the traffic analysis engine. The optimization engine may then rank the fundamentals remaining in the traffic list according to analytical priority. The optimization engine may then designate resources of the system, as may have been determined by the resource analysis engine, to each of the fundamentals to be analyzed.

The monitoring engine will now be discussed in greater detail. The monitoring engine may monitor the network traffic relating to the fundamentals. The monitoring engine may continue to analyze the fundamentals during a grand reset period. More specifically, the monitoring engine may analyze the fundamentals in the traffic list during a timeout period. If the monitoring engine completes its monitoring of all the fundamentals in the list in the timeout period, but prior to expiration of the grand reset period, the monitoring engine may perform a subsequent monitoring operation of the fundamentals in the traffic list and/or analyze one or more pieces of data from the collection list. After the grand reset period has expired for a network, monitoring for that network may be reset. Different networks may have different grand reset periods.

Skilled artisans will appreciate that each of the engines discussed above may operate collectively, independently, synchronously, or in another relation with one another. Each engine may control discrete instruction sets. Alternatively, the engines discussed above may be included in one uniform instruction set of the system and respectively define various operations performed by the system. Some operations may overlap. Additional engines may be included by the system. Those of skill in the art should not view this discussion of engines to limit the present invention in any way.

In operation, the system may monitor one or more router and/or client device on a managed network. Along with reference to flowchart 100 of FIG. 1, an illustrative operation of the system will now be discussed generally. Starting at Block 102, the resources of the system may be mapped. (Block 104). Mapping resources of the system will be discussed in greater detail below, along with flowchart 120. The system may then analyze the fundamentals relative to the resources. (Block 106). Analysis of the fundamentals will be discussed in greater detail below, along with flowchart 140. The system may next place the fundamentals in subsets of data. (Block 108). The system may then optimize the fundamentals in the subsets. (Block 110). Optimization will be discussed in greater detail below, along with flowchart 160. Additionally, the system may monitor the optimized fundamentals within the grand reset period. (Block 112). Monitoring of the fundamentals is discussed in greater detail below along with flowchart 180. The operation may then terminate at Block 114.

Figure 2:
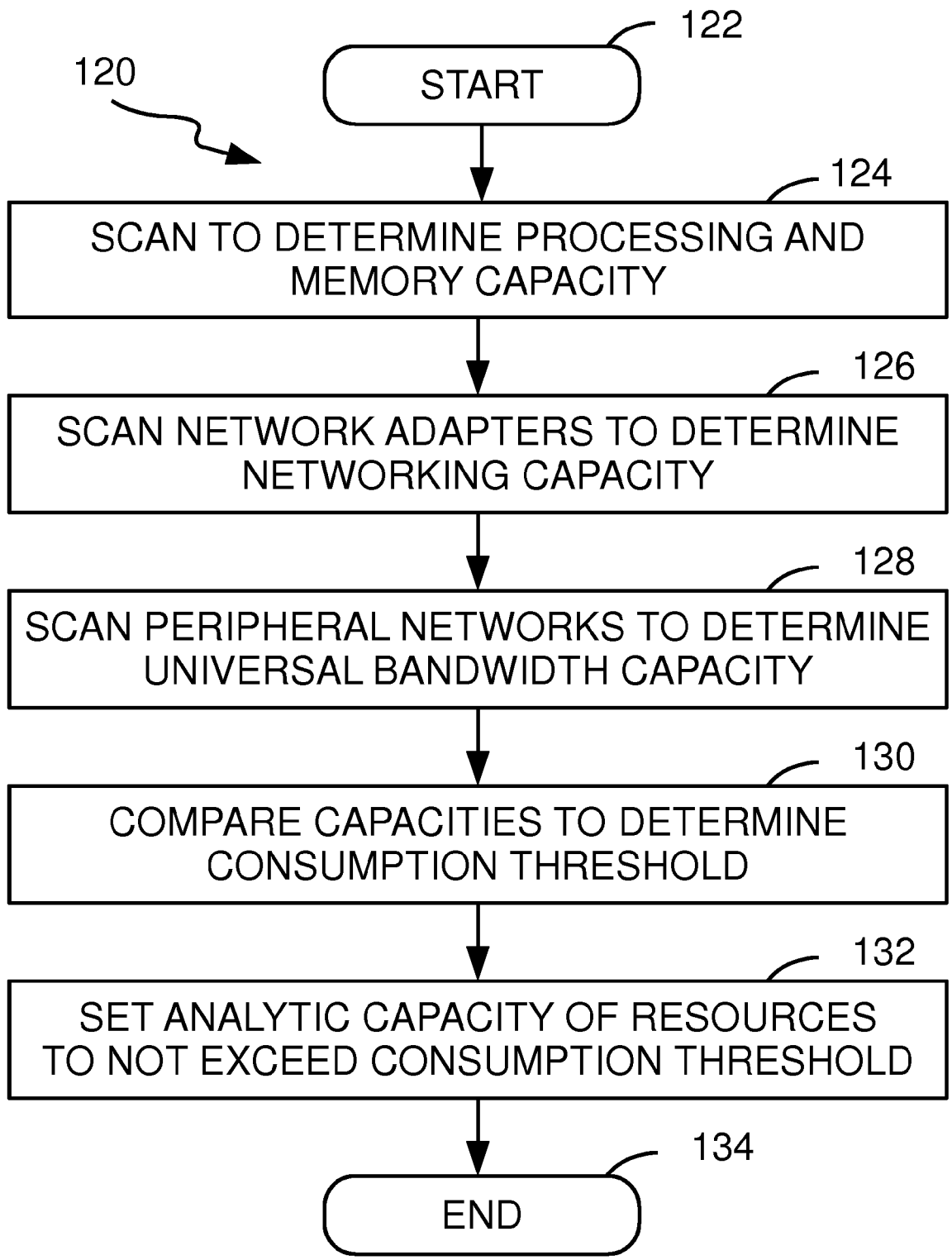
FIG. 2 is a flowchart that illustrates mapping of system resources, according to an embodiment of the present invention.

Along with reference to flowchart 120 of FIG. 2, an illustrative operation of mapping system resources will now be discussed. Starting at Block 122, resources of an analytical system may be scanned to determine a processing capacity and memory capacity, as discussed above. (Block 124). A network adapter may be scanned to determine network capacity. (Block 126). If the system is configured to determine a universal bandwidth capacity, peripheral networks may be scanned and analyzed to determine the universal bandwidth capacity. (Block 128). The processing capacity, memory capacity, network capacity, and/or universal bandwidth capacity may then be compared to determine a consumption threshold. (Block 130). The system may then set an analytic capacity of the resources to not be exceeded by the consumption threshold. (Block 132). The operation may then terminate at Block 134.

Figure 3:
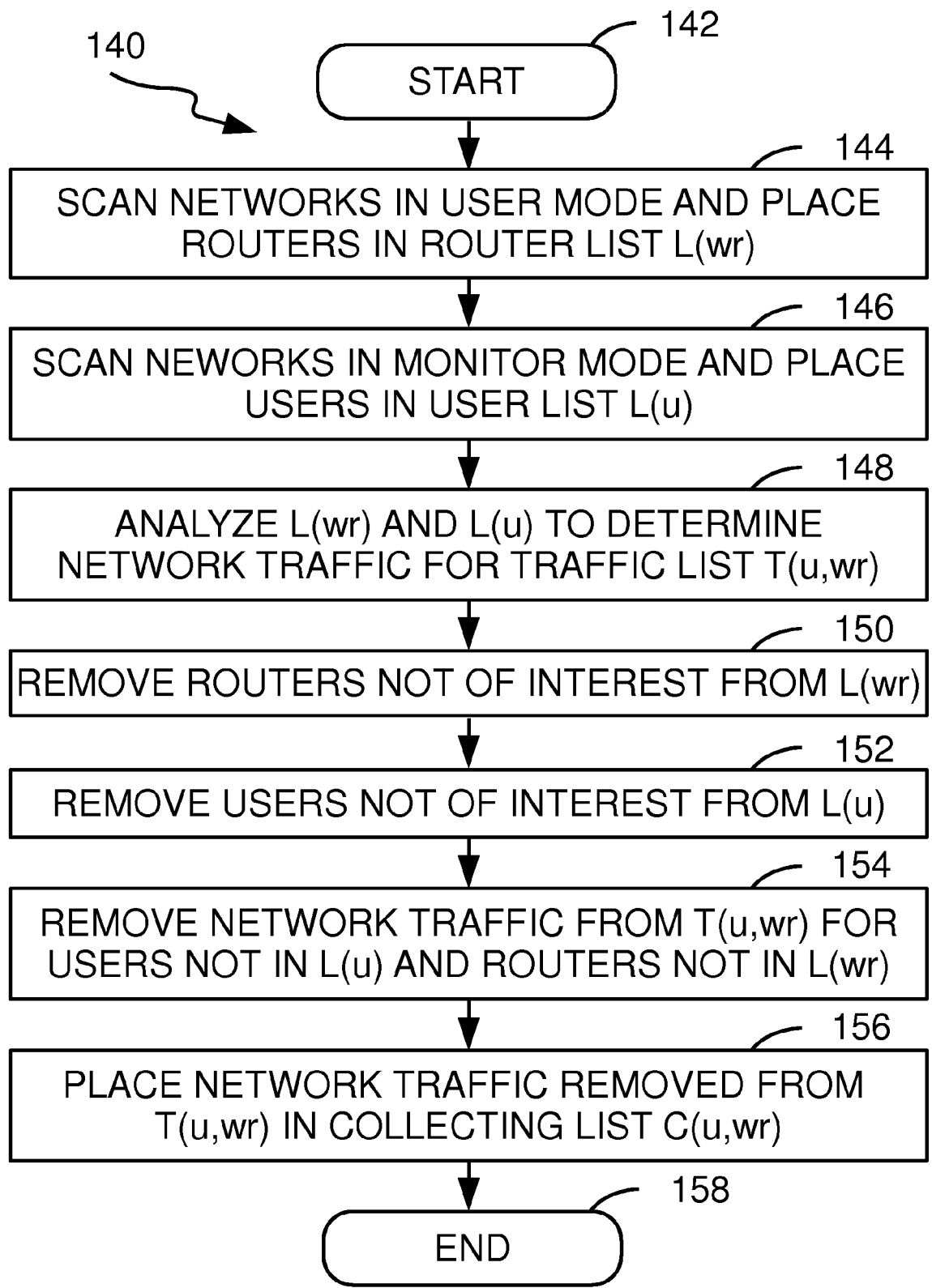
FIG. 3 is a flowchart that illustrates analyzing fundamentals, according to an embodiment of the present invention.

Along with reference to flowchart 140 of FIG. 3, an illustrative operation of analyzing fundamentals will now be discussed. Starting at Block 142, the system may scan networks in user mode to locate routers, which may be placed in a router list L(wr). (Block 144). The system may then scan networks in monitor mode to locate users, which may be placed in a user list L(u). (Block 146). The router list L(wr) and user list L(u) may then be analyzed to determine network traffic of interest to be included in a traffic list T(u,wr). (Block 148). Wireless routers that are not of interest may be removed from the router list L(wr). (Block 150). Similarly, users that are not of interest may be removed from the user list L(u). (Block 152). Network traffic relating to routers removed from the router list L(wr) and users removed from the user list L(u) may then be removed from the traffic list T(u,wr). (Block 154). The removed users and/or routers may be placed in a collecting list C(u,wr). (Block 156). The operation may then terminate at Block 158.

Figure 4:
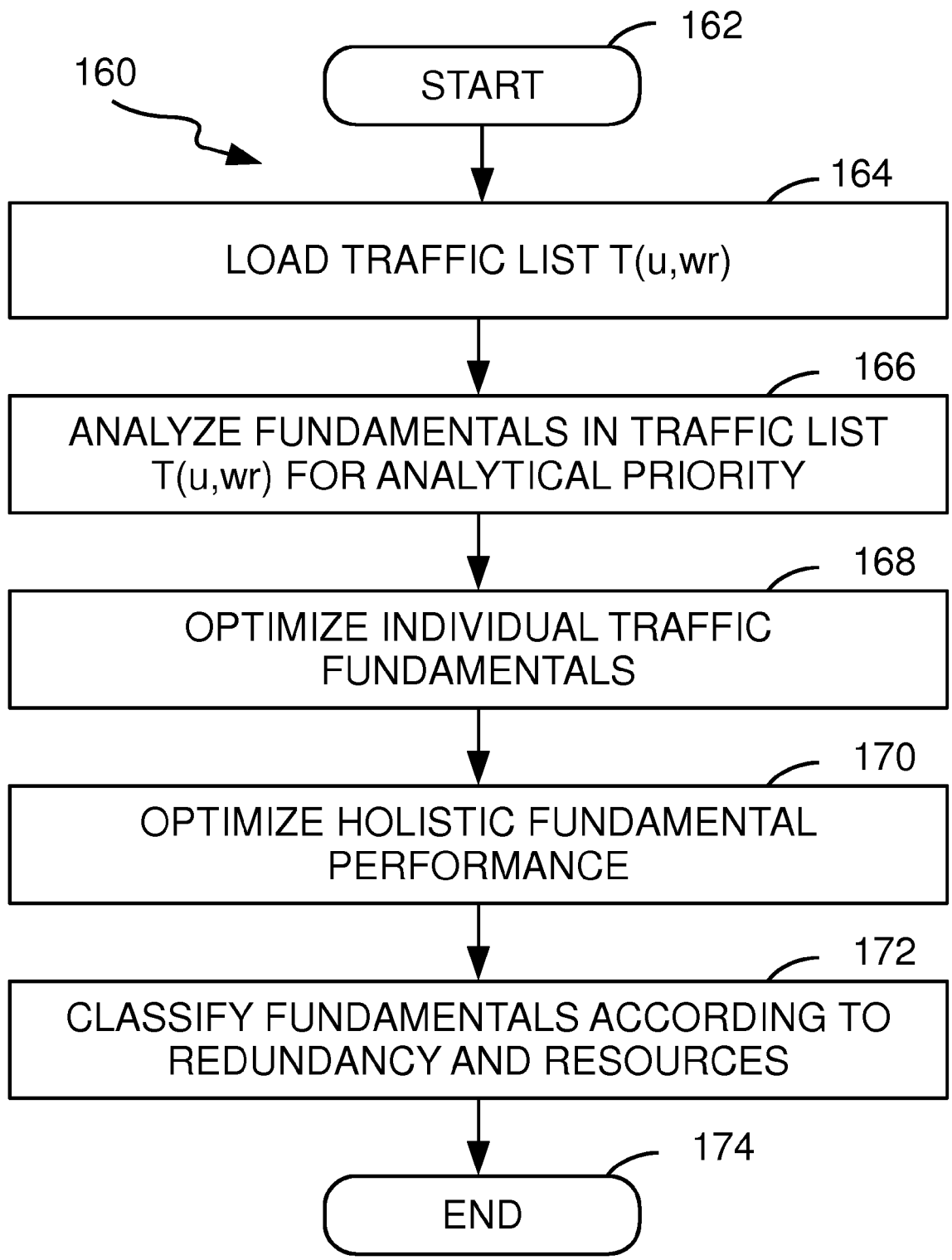
FIG. 4 is a flowchart that illustrates optimizing a system for efficient monitoring, according to an embodiment of the present invention.

Along with reference to flowchart 160 of FIG. 4, an illustrative operation for optimization will now be discussed. Starting at Block 162, the system may load the traffic list T(u,wr). (Block 164). The system may then analyze the fundamentals included by the traffic list T(u,wr) for analytical priority. (Block 166). The individual traffic fundamentals may then be optimized. (Block 168). Additionally, holistic fundamental performance may be optimized. (Block 170). The fundamentals may then be classified according to redundancy with respect to the system resources. (Block 172). The operation may then terminate at Block 174.

Figure 5:
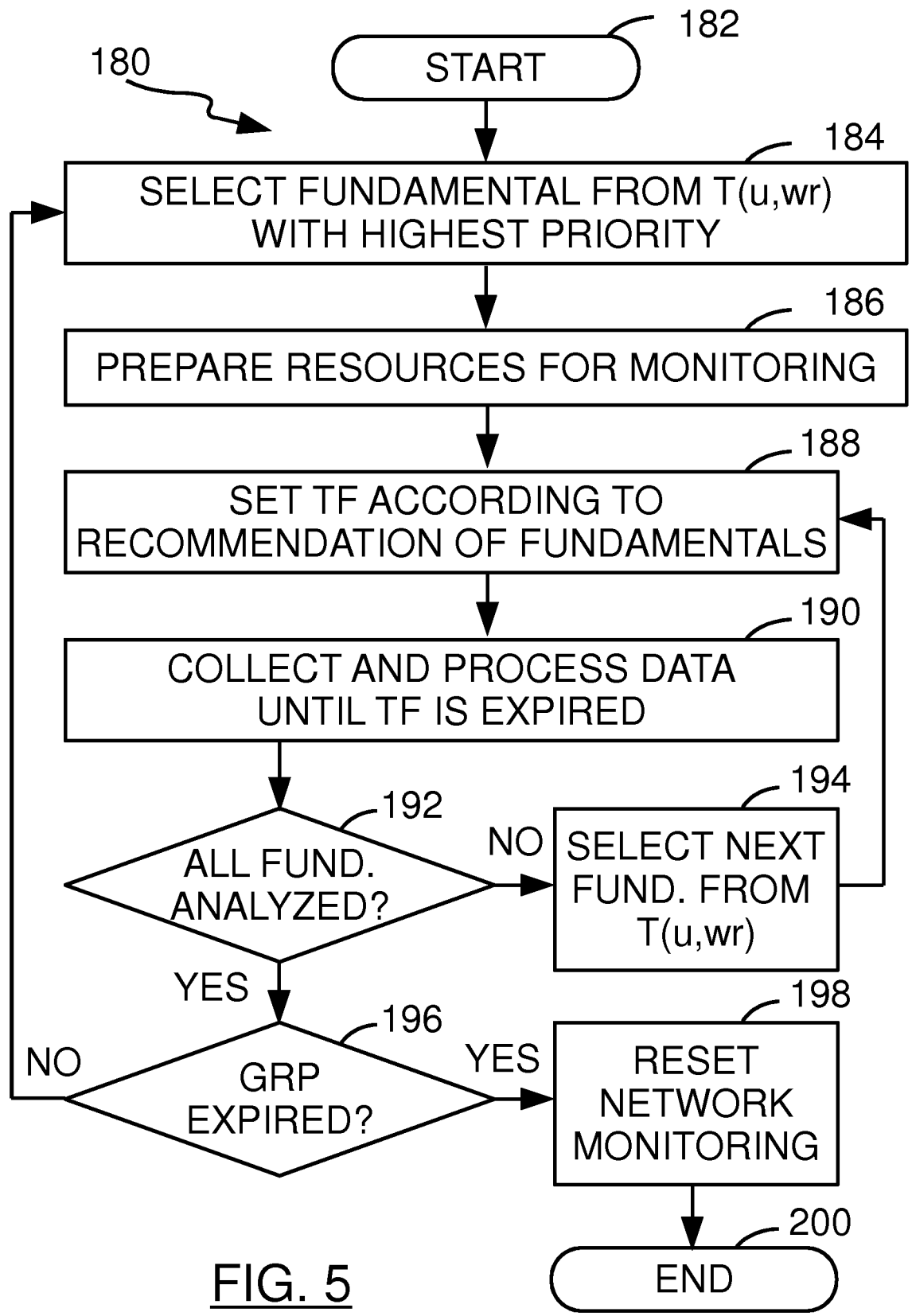
FIG. 5 is a flowchart that illustrates a monitoring operation, according to an embodiment of the present invention.

Along with reference to flowchart 180 of FIG. 5, an illustrative operation for monitoring network traffic will now be discussed. Starting at Block 182, the system may select a fundamental from the traffic list T(u,wr) with the highest analytical priority. (Block 184). The resources may then be prepared for monitoring the fundamental. (Block 186). The timeout period TF may be set according to the requirements of the fundamental. (Block 188). The system may then collect and process data until the timeout period TF has expired. (Block 190). Next, the system may determine whether all the fundamentals in the traffic list have been analyzed. (Block 192).

If the system determines that fundamentals still remain to be analyzed at Block 192, the system may proceed to the operation of Block 194 and select the next fundamental from the traffic list. The system may then return to the operation of Block 188 and again set the timeout period TR. If the system determines that no fundamentals remain to be analyzed at Block 192, the system may proceed to the operation of Block 196 and determine whether the grand reset period has expired. If it is determined at Block 196 that the grand reset period has not expired, the system may return to the operation of Block 184 and again select a fundamental from the traffic list. Additionally, the system may analyze network traffic relating to one or more user and/or router in the collecting list C(u,wr). If it is determined at Block 196 that the grand reset period has expired, the system may proceed to the operation of Block 198 and reset the monitoring of the network. The operation may then terminate at Block 200.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for monitoring networks using a system comprising a processor and memory, the method comprising:
(a) mapping resources of the system to determine an analytic capacity;
(b) analyzing fundamentals respective to the analytic capacity to determine a subset of data to be analyzed, wherein the fundamentals are at least partially identifiable by analyzing metadata of network traffic;
(c) analyzing the metadata for the fundamentals in the subset to determine a wireless connection to be monitored, further comprising:
(i) scanning the networks in user mode to determine routers on each channel,
(ii) placing the routers detected in a router list,
(iii) scanning the networks in monitor mode to determine users connected to the networks,
(iv) placing the users detected in a user list, and
(v) analyzing the router list and the user list to determine the network traffic for monitoring to be placed in a traffic list;
(d) optimizing the subset for analysis efficiency, further comprising:
(i) analyzing the fundamentals in the traffic list,
(ii) removing the fundamentals that communicate the network traffic that is redundant from the traffic list,
(iii) ranking the fundamentals remaining in the traffic list according to analytical priority, and
(iv) designating the resources of the system to the each of the fundamentals to be analyzed;
(e) monitoring the network traffic relating to the fundamentals to be analyzed prior to expiration of a grand reset period; and
(f) resetting after the grand reset period has expired.

2. The method claim 1, wherein step (a) further comprises:
(i) scanning the system to determine a processing capacity of the processor and a memory capacity of the memory;
(ii) scanning a network adapter of the system to determine a network capacity comprising connection speed and a level of network consumption;
(iii) comparing the processing capacity, the memory capacity, and the network capacity to determine a consumption threshold; and
(iv) determining the analytic capacity to not exceed the consumption threshold of a given period of analysis.

3. The method of claim 2, wherein step (a) further comprises before operation (iii):
(v) scanning utilization of peripheral networks to determine a universal bandwidth capacity; and
wherein operation (iii) of step (a) further comprises comparing the universal bandwidth capacity with the processing capacity, the memory capacity, and the network capacity to determine the consumption threshold.

4. The method of claim 1, wherein under step (c), scanning in monitor mode further comprises waking devices connected via the networks that are in sleep mode.

5. The method of claim 1, wherein step (c) further comprises:
(vi) removing the routers not of interest from the router list;
(vii) removing the users not of interest from the user list; and
(viii) placing the network traffic not being monitored in a collecting list accessible for supplemental analysis when demanded and where the resources permit.

6. The method of claim 1, wherein the step (c) further comprises analyzing ad-hoc network traffic and mesh network traffic operating at least partially within range of the networks to be monitored.

7. The method of claim 1, wherein analyzing the metadata comprises extracting the metadata from a local monitor and sending at least part of the metadata to a remote server for additional analysis.

8. The method of claim 1, wherein the grand reset period is independently definable for each of the networks.

9. A method for monitoring networks using a system comprising a processor and memory, the method comprising:
(a) analyzing fundamentals respective to an analytic capacity of the system to determine a subset of data to be analyzed, wherein the fundamentals are at least partially identifiable by analyzing metadata of a network traffic;
(b) analyzing the metadata for the fundamentals in the subset to determine a wireless connection to be monitored;
(c) optimizing the subset for analysis efficiency, further comprising:
(i) including the fundamentals to be analyzed in a traffic list,
(ii) analyzing the fundamentals in the traffic list,
(iii) removing the fundamentals that communicate the network traffic that is redundant from the traffic list,
(iv) ranking the fundamentals remaining in the traffic list according to analytical priority, and
(v) designating resources of the system to the each of the fundamentals to be analyzed;
(d) monitoring the network traffic relating to the fundamentals to be analyzed prior to expiration of a grand reset period; and
(e) resetting after the grand reset period has expired;
wherein the grand reset period is independently definable for each of the networks;
wherein the metadata is extractable using a local monitor;
wherein at least part of the metadata is transmittable to a remote server for additional analysis;
wherein ad-hoc network traffic and mesh network traffic operating at least partially within range of the networks to be monitored is detectable via the metadata and subject to analysis.

10. The method of claim 9, further comprising before step (a):
(f) mapping the resources of the system to determine the analytic capacity.

11. The method claim 10, wherein step (f) further comprises:
(i) scanning the system to determine a processing capacity of the processor and a memory capacity of the memory;
(ii) scanning a network adapter of the system to determine a network capacity comprising connection speed and a level of network consumption;
(iii) comparing the processing capacity, the memory capacity, and the network capacity to determine a consumption threshold; and
(iv) determining the analytic capacity to not exceed the consumption threshold for a given period of analysis.

12. The method of claim 11, wherein step (f) further comprises before operation (iii):
(v) scanning utilization of peripheral networks to determine a universal bandwidth capacity; and
wherein operation (iii) of step (f) further comprises comparing the universal bandwidth capacity with the processing capacity, the memory capacity, and the network capacity to determine the consumption threshold.

13. The method of claim 9, wherein step (b) further comprises:
(i) scanning the networks in user mode to determine routers on each channel;
(ii) placing the routers detected in a router list;
(iii) scanning the networks in monitor mode to determine users connected to the networks;
(iv) placing the users detected in a user list; and
(v) analyzing the router list and the user list to determine the network traffic for monitoring to be placed in a traffic list.

14. The method of claim 13, wherein under step (b), scanning in monitor mode further comprises waking devices connected via the networks that are in sleep mode.

15. The method of claim 13, wherein step (b) further comprises:
(vi) removing the routers not of interest from the router list;
(vii) removing the users not of interest from the user list; and
(viii) placing the network traffic not being monitored in a collecting list accessible for supplemental analysis when demanded and where the resources permit.

16. A system for monitoring networks comprising:
memory to hold executable instructions;
a processor for executing the instructions stored in the memory;
a resource analysis engine to map resources of the system to determine an analytic capacity;
a fundamentals analysis engine to analyze fundamentals respective to the analytic capacity and determine a subset of data to be monitored, wherein the fundamentals are at least partially identifiable by analyzing metadata of network traffic;
a traffic analysis engine for analyzing the metadata for the fundamentals in the subset to determine a wireless connection to be monitored, the traffic analysis engine performing the steps:
(a) scanning the networks in user mode to determine routers on each channel,
(b) placing the routers detected in a router list,
(c) removing the routers not of interest from the router list,
(d) scanning the networks in monitor mode to determine users connected to the networks,
(e) placing the users detected in a user list,
(f) removing the users not of interest from the user list,
(g) analyzing the router list and the user list to determine the network traffic for monitoring to be placed in a traffic list, and
(h) placing the network traffic not being monitored in a collecting list accessible for supplemental analysis when demanded and where the resources permit;
an optimization engine for optimizing the subset for analysis efficiency, the optimization engine performing the steps:
(i) analyzing the fundamentals in the traffic list,
(j) removing the fundamentals that communicate the network traffic that is redundant from the traffic list,
(k) ranking the fundamentals remaining in the traffic list according to analytical priority, and
(l) designating the resources of the system to each of the fundamentals to be analyzed; and
a monitoring engine to monitor the network traffic relating to the fundamentals to be analyzed prior to expiration of a grand reset period;
wherein monitoring of the network traffic is reset after the grand reset period has expired;
wherein the grand reset period is independently definable for each of the networks;
wherein scanning in monitor mode further comprises waking devices connected via the networks that are in sleep mode.

17. The system of claim 16 wherein the resource analysis engine further performs the steps:
(m) scanning the system to determine a processing capacity of the processor and a memory capacity of the memory;
(n) scanning a network adapter of the system to determine a network capacity comprising connection speed and a level of network consumption;
(o) comparing the processing capacity, the memory capacity, and the network capacity to determine the a consumption threshold; and
(p) determining the analytic capacity to not exceed the consumption threshold for a given period of analysis.

18. The system of claim 17, wherein the resource analysis engine scans utilization of peripheral networks to determine a universal bandwidth capacity, and wherein the resource analysis engine compares the universal bandwidth capacity with the processing capacity, the memory capacity, and the network capacity to determine the consumption threshold.

19. The system of claim 16, wherein ad-hoc network traffic and mesh network traffic operating at least partially within range of the networks is optionally monitored by the traffic analysis engine.

20. The system of claim 16, wherein analyzing the metadata comprises extracting the metadata from a local monitor and sending at least part of the metadata to a remote server for additional analysis.

* * * * *